United States Patent
Lee et al.

(10) Patent No.: US 9,854,502 B2
(45) Date of Patent: Dec. 26, 2017

(54) METHOD AND APPARATUS FOR SUPPORTING AN IOPS IN A WIRELESS ACCESS SYSTEM

(71) Applicant: LG ELECTRONICS INC., Seoul (KR)

(72) Inventors: Ki-Dong Lee, San Diego, CA (US); Sang Gook Kim, San Diego, CA (US)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 15/122,395

(22) PCT Filed: Apr. 3, 2015

(86) PCT No.: PCT/KR2015/003377
§ 371 (c)(1),
(2) Date: Aug. 29, 2016

(87) PCT Pub. No.: WO2015/152681
PCT Pub. Date: Oct. 8, 2015

(65) Prior Publication Data
US 2017/0078947 A1    Mar. 16, 2017

Related U.S. Application Data (60) Provisional application No. 61/974,989, filed on Apr. 3, 2014, provisional application No. 61/987,445, filed on May 1, 2014.

(51) Int. Cl.
*H04W 48/02* (2009.01)
*H04W 76/06* (2009.01)
(Continued)

(52) U.S. Cl.
CPC ............. *H04W 48/02* (2013.01); *H04W 4/22* (2013.01); *H04W 68/005* (2013.01);
(Continued)

(58) Field of Classification Search
CPC . H04W 76/046; H04W 76/06; H04W 76/068; H04W 72/04
See application file for complete search history.

(56) References Cited

U.S. PATENT DOCUMENTS

| | | | |
|---|---|---|---|
| 8,750,123 B1* | 6/2014 | Alisawi | H04W 28/0284 370/231 |
| 2004/0125800 A1* | 7/2004 | Zellner | H04W 72/10 370/389 |

(Continued)

FOREIGN PATENT DOCUMENTS

| | | |
|---|---|---|
| WO | 2013048100 | 4/2013 |
| WO | 2013098461 | 7/2013 |
| WO | 2013180931 | 12/2013 |

OTHER PUBLICATIONS

3rd Generation Partnership Project (3GPP), "3rd Generation Partnership Project; Technical Specification Group Services and System Aspects; Study on Isolated E-UTRAN operation for Public Safety (Release 13)," 3GPP TR 22.897 V1.0.0, Feb. 2014, 23 pages.

(Continued)

*Primary Examiner* — Dung Hong
(74) *Attorney, Agent, or Firm* — Lee Hong Degerman Kang Waimey (57) ABSTRACT

The present invention relates to a method and apparatus for supporting an IOPS and notifying the IOPS status. In one aspect of the present invention, a method for supporting an Isolated E-UTRAN Operations for Public Safety (IOPS) in a wireless access system, the method performed by a User Equipment (UE) in a RRC connection mode and comprises steps of receiving a radio resource control (RRC) connection release message including a release cause field and an IOPS extended wait time field for restricting an initial access procedure; and releasing the RRC connection mode when the release cause field indicating an IOPS situation has been (Continued)

occurred, wherein the IOPS extended wait time field is configured to an Extended Wait Time (EWT) field indicating a time duration restricting the initial access procedure or to a Further Announcement field indicating the initial access procedure is restricted until a further announcement is received.

9 Claims, 8 Drawing Sheets

(51) Int. Cl.
    *H04W 4/22*     (2009.01)
    *H04W 68/00*     (2009.01)
    *H04W 48/04*     (2009.01)
    *H04W 76/02*     (2009.01)

(52) U.S. Cl.
    CPC ............ *H04W 76/06* (2013.01); *H04W 48/04* (2013.01); *H04W 76/027* (2013.01)

(56) References Cited

U.S. PATENT DOCUMENTS

| | | | |
|---|---|---|---|
| 2004/0224688 A1* | 11/2004 | Fischer | H04W 76/02 455/435.1 |
| 2012/0287851 A1* | 11/2012 | Lee | H04W 48/02 370/328 |
| 2013/0039244 A1* | 2/2013 | Sun | H04W 52/0235 370/311 |
| 2013/0051325 A1* | 2/2013 | Ryu | H04W 74/0833 370/328 |
| 2013/0279330 A1* | 10/2013 | Feng | H04W 48/06 370/230 |
| 2013/0324141 A1* | 12/2013 | Jung | H04W 4/005 455/450 |
| 2014/0056134 A1* | 2/2014 | Koskinen | H04W 48/06 370/230 |
| 2015/0173104 A1* | 6/2015 | Takahashi | H04W 4/22 370/329 |
| 2016/0278096 A1* | 9/2016 | Watfa | H04W 28/0205 |

OTHER PUBLICATIONS

TSG SA WG1, "New WID on Isolated E-UTRAN Operation for Public Safety (IOPS)," 3GPP TSG SA #63, TD SP-140069, Feb. 2014, 8 pages.

PCT International Application No. PCT/KR20151003377, Written Opinion of the International Searching Authority dated Jul. 22, 2015, 10 pages.

* cited by examiner

(a) Control-plane protocol stack (b) User-plane protocol stack

METHOD AND APPARATUS FOR SUPPORTING AN LOPS IN A WIRELESS ACCESS SYSTEM

CROSS-REFERENCE TO RELATED APPLICATIONS

This application is the National Stage filing under 35 U.S.C. 371 of International Application No. PCT/KR2015/003377, filed on Apr. 3, 2015, which claims the benefit of U.S. Provisional Application No. 61/974,989, filed on Apr. 3, 2014, and 61/987,445, filed on May 1, 2014, the contents of which are all hereby incorporated by reference herein in their entirety.

TECHNICAL FIELD

The present invention relates to a wireless access system, and more particularly, to methods and apparatus for supporting an Isolated E-UTRAN Operations for Public Safety (IOPS) and notifying the IOPS status.

BACKGROUND ART

A wireless communication system has been widely developed to provide various kinds of communication services such as voice and data. Generally, the wireless communication system is a multiple access system that can support communication with multiple users by sharing available system resources (bandwidth, transmission power, etc.). Examples of the multiple access system include a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

DETAILED DESCRIPTION OF THE INVENTION

Technical Problems

Accordingly, the object of the present invention is to provide methods and apparatuses for supporting an Isolated E-UTRAN Operations for Public Safety (IOPS).

Another object of the present invention is to provide method for providing Isolated E-UTRAN Operations Status for Public Safety (IOPS) notification for public safety UEs.

Still another object of the present invention is to provide method for providing the IOPS status information and/or E-UTRAN operation status for commercial UEs.

Still another object of the present invention is to provide apparatus such as a user equipment (UE) and/or a base station for supporting the above-described methods.

Technical problems to be solved by the present invention are not limited to the above-mentioned technical problem, and other technical problems not mentioned above can be clearly understood by one skilled in the art from the following description.

Technical Solutions

The present invention relates to a method and apparatus for supporting an IOPS and notifying the IOPS status.

In one aspect of the present invention, a method for supporting an Isolated E-UTRAN Operations for Public Safety (IOPS) in a wireless access system, the method performed by a User Equipment (UE) in a RRC connection mode and comprises steps of receiving a radio resource control (RRC) connection release message including a release cause field and an IOPS extended wait time field for restricting an access procedure; and releasing the RRC connection mode when the release cause field indicating an TOPS situation has been occurred, wherein the IOPS extended wait time field is configured to an Extended Wait Time (EWT) field indicating a time duration restricting the access procedure or to a Further Announcement field indicating the access procedure is restricted until a further announcement is received.

The method may further comprises step of performing an IOPS operation with the base station during the time duration.

The method may further comprises step of performing the access procedure after the time duration is expired, when the IOPS extended wait time field has been set to an Extended Wait Time field.

The method may further comprises steps of receiving the further announcement indicating the IOPS situation is resolved, when the IOPS extended wait time field has been set to the Further Announcement field; and performing the access procedure. In this case, the further announcement may be received via a System Information Block or a paging message.

In another aspect of the present invention, a method for supporting an Isolated E-UTRAN Operations for Public Safety (IOPS) in a wireless access system, the method performed by an e-Node B (eNB) and comprises steps of configuring a radio resource control (RRC) connection release message including a release cause field and an IOPS extended wait time field for restricting an access procedure; and transmitting the RRC connection release message, wherein the IOPS extended wait time field is configured to an Extended Wait Time field indicating a time duration restricting the access procedure or to a Further Announcement field indicating the access procedure is restricted until a further announcement is received.

The method may further comprises step of determining whether to continue or disconnect a RRC connected mode of a user equipment based on the user type when the IOPS has been occurred.

The method may further comprises step of performing an IOPS operation with a public safety user equipment (PS UE) during the time duration.

The method may further comprises step of performing the access procedure with a user equipment after the time duration is expired, when the IOPS extended wait time field is set to an Extended Wait Time field.

The method may further comprises steps of transmitting the further announcement indicating the IOPS situation is resolved, when the IOPS extended wait time field is set to the Further Announcement field; and performing the access procedure.

In this case, the further announcement may be transmitted via a System Information Block or a paging message.

The above embodiments are part of preferred embodiments of the present invention. Obviously, it is to be understood to those having ordinary knowledge in the art that various embodiments having the technical features of the present invention can be implemented on the detailed description of the present invention as set forth herein.

Advantageous Effects

According to exemplary embodiments of the present invention, the following advantages can be obtained.

First of all, the IOPS operations by the UE and eNB can be properly performed by defining new IOPS parameters and IOPS actions.

Secondary, the public safety UE and commercial UE are able to support the IOPS operation even if the isolated E-UTRAN has been created.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

BEST MODE FOR CARRYING OUT THE INVENTION

Exemplary embodiments of the present invention provide a method and apparatus for indicating time zone changes.

The embodiments of the present invention described below are combinations of elements and features of the present invention in specific forms. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or elements of any one embodiment may be included in another embodiment and may be replaced with corresponding constructions or features of another embodiment.

In the description of the attached drawings, a detailed description of known procedures or steps of the present invention will be avoided lest it should obscure the subject matter of the present invention. In addition, procedures or steps that could be understood by those skilled in the art will not be described either.

In the embodiments of the present invention, a description has been mainly made of a data transmission and reception relationship between a BS and a UE. A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an eNode B (eNB), an ABS (Advanced Base Station), an access point, etc.

The term UE may be replaced with the terms MS (Mobile Station), SS (Subscriber Station), MSS (Mobile Subscriber Station), AMS (Advanced Mobile Station), mobile terminal, etc. Especially, it should be noted that the terms 'eNB' and 'eNode-B' are used interchangeably and the terms 'UE' and 'terminal' are interchangeably used in the embodiments of the present invention.

A transmitter is a fixed and/or mobile node that provides a data or voice service and a receiver is a fixed and/or mobile node that receives a data or voice service. Therefore, an MS may serve as a transmitter and a BS may serve as a receiver, on uplink. Likewise, the MS may serve as a receiver and the BS may serve as a transmitter, on downlink.

The embodiments of the present invention are supported by standard documents disclosed for at least one of wireless access systems including IEEE 802.xx systems, a 3GPP system, a 3GPP LTE system, and a 3GPP2 system. In particular, the embodiments of the present invention are supported by 3GPP TS 22.011, 3GPP TS 36.211, 3GPP TS 36.212, 3GPP TS 36.213, 3GPP TS 36.321, and 3GPP TS 36.331 documents. The steps or parts, which are not described to clearly reveal the technical idea of the present invention, in the embodiments of the present invention may be supported by the above documents. All terms used in the embodiments of the present invention may be explained by the standard documents.

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention. Specific terms used for the embodiments of the present invention are provided to aid in understanding of the present invention. These specific terms may be replaced with other terms within the scope and spirit of the present invention.

The embodiments of the present invention may be used in various wireless access technologies, such as CDMA (Code Division Multiple Access), FDMA (Frequency Division Multiple Access), TDMA (Time Division Multiple Access), OFDMA (Orthogonal Frequency Division Multiple access), and SC-FDMA (Single Carrier Frequency Division Multiple Access).

CDMA may be implemented with radio technology such as UTRA (Universal Terrestrial Radio Access) or CDMA2000. TDMA may be implemented with radio technology such as GSM (Global System for Mobile communications)/GPRS (General Packet Radio Service)/EDGE (Enhanced Data Rates for GSM Evolution). OFDMA may be implemented with radio technology such as IEEE 802.11 (Wi-Fi), IEEE 802.16 (WiMAX), IEEE 802.20, and E-UTRA (Evolved UTRA).

UTRA is part of a UMTS (Universal Mobile Telecommunications System). 3GPP LTE is a part of Evolved UMTS (E-UMTS), which uses E-UTRA. 3GPP LTE employs OFDMA on downlink and uses SC-FDMA on uplink. LTE-A (Advanced) is an evolved version of 3GPP LTE. The following embodiments of the present invention mainly describe examples of the technical characteristics of the present invention as applied to the 3GPP LTE/LTE-A systems.

1. An Overall of 3GPP LTE/LTE-A Systems

In a wireless access system, a UE receives information from a BS through a downlink and transmits information to the BS through an uplink. Information transmitted and received between the UE and the BS includes general data information and control information. A variety of physical channels are provided according to type/use of information transmitted and received between the UE and the BS.

1.1 System Architecture

Figure 1:
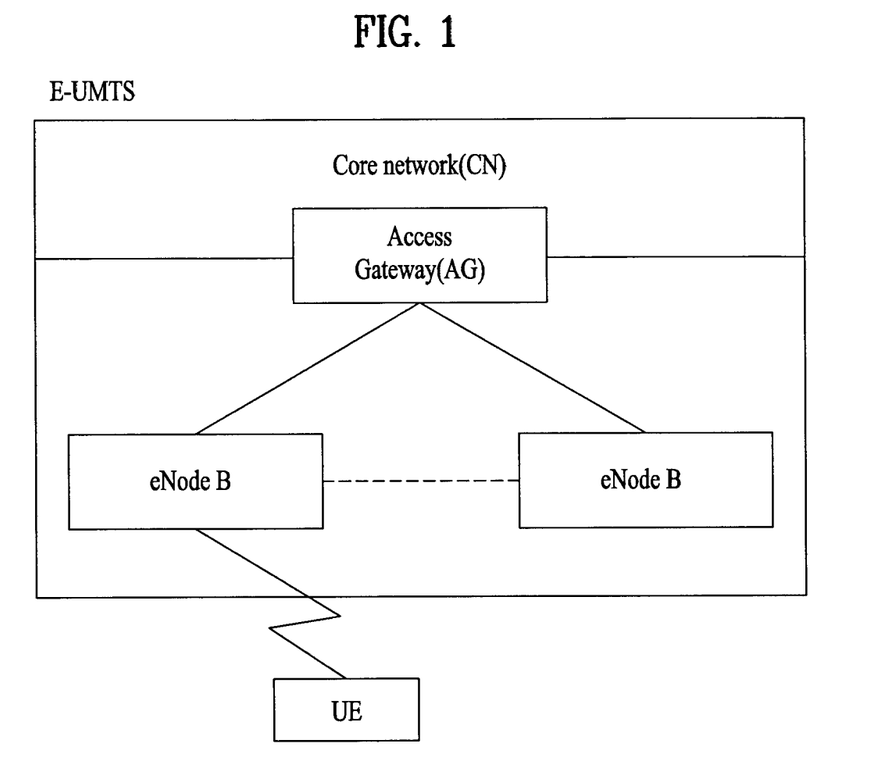
FIG. 1 illustrates a schematic structure a network structure of an evolved universal mobile telecommunication system (E-UMTS)

FIG. 1 illustrates a schematic structure a network structure of an evolved universal mobile telecommunication system (E-UMTS). An E-UMTS system is an evolved version of the WCDMA UMTS system and basic standardization thereof is in progress under the 3rd Generation Partnership Project (3GPP). The E-UMTS is also referred to as a Long Term Evolution (LTE) system. For details of the technical specifications of the UMTS and E-UMTS, refer to Release 8 to Release 11 of "3rd Generation Partnership Project; Technical Specification Group Radio Access Network".

Referring to FIG. 1, the E-UMTS mainly includes a User Equipment (UE), base stations (BSs, or eNBs or eNode Bs), and an Access Gateway (AG) which is located at an end of a network (e.g., E-UTRAN) and which is connected to an external network. Generally, an eNB can simultaneously transmit multiple data streams for a broadcast service, a multicast service and/or a unicast service.

The AG can be divided into a part that handles processing of user traffic and a part that handles control traffic. Here, the AG part for processing new user traffic and the AG part for processing control traffic can communicate with each other using a new interface. One or more cells may be present for one eNB. An interface for transmitting user traffic or control traffic can be used between eNBs.

A Core Network (CN) may include the AG and a network node or the like for user registration of UEs. An interface for discriminating between the E-UTRAN and the CN can be used. The AG manages mobility of a UE on a Tracking Area (TA) basis. One TA includes a plurality of cells. When the UE has moved from a specific TA to another TA, the UE notifies the AG that the TA where the UE is located has been changed.

Figure 2:
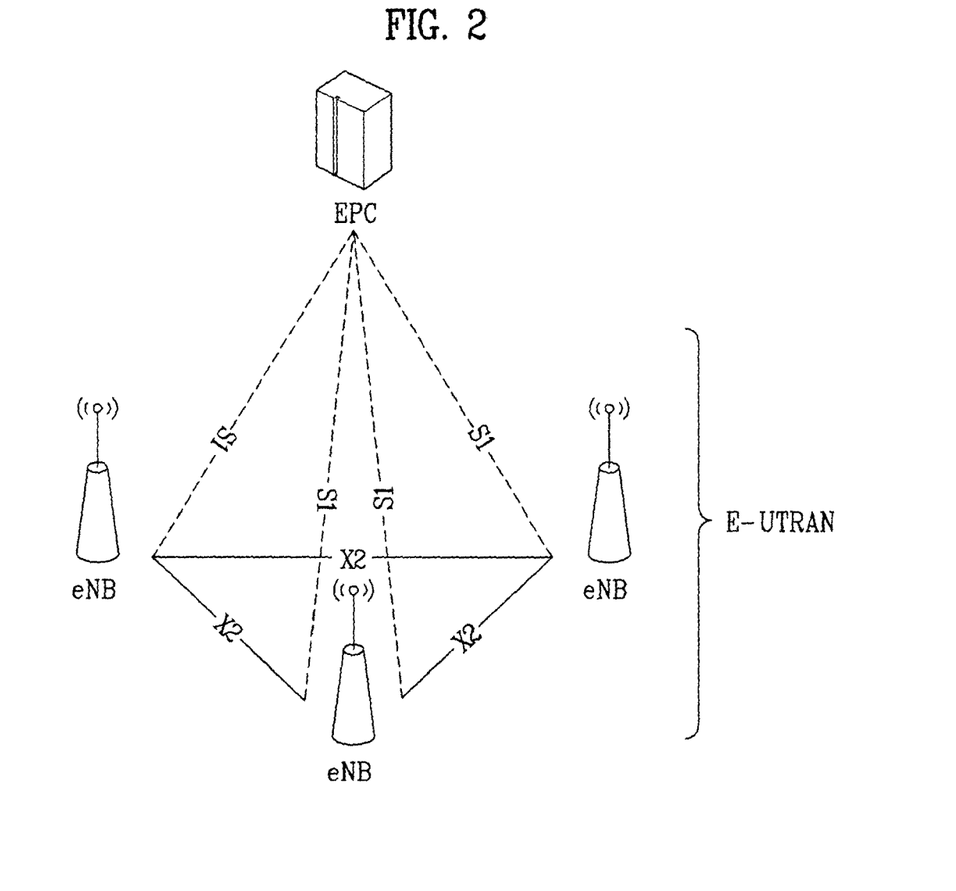
FIG. 2 illustrates a schematic structure of an Evolved Universal Terrestrial Radio Access Network (E-UTRAN)

FIG. 2 illustrates a network structure of an Evolved Universal Terrestrial Radio Access Network (E-UTRAN) system. The E-UTRAN system is an evolved version of the conventional UTRAN system. The E-UTRAN includes one or more base stations that will also be referred to as "eNode Bs" or "eNBs".

The eNBs are connected through X2 interfaces. The X2 user plane interface (X2-U) is defined between eNBs. The X2-U interface provides nonguaranteed delivery of user plane PDUs. The X2 control plane interface (X2-CP) is defined between two neighbor eNBs. The X2-CP performs following functions: context transfer between eNBs, control of user plane tunnels between source eNB and target eNB, transfer of handover related messages, uplink load management and the like.

Each eNB is connected to User Equipment (UE) through a radio interface and is connected to an Evolved Packet Core (EPC) through an S1 interface. The S1 user plane interface (S1-U) is defined between the eNB and the S-GW. The S1-U interface provides nonguaranteed delivery of user plane PDUs between the eNB and the S-GW (Serving Gateway). The S1 control plane interface (S1-MME) is defined between the eNB and the MME (Mobility Management Entity). The S1 interface performs following functions: EPS (Enhanced Packet System) Bearer Service Management function, NAS (Non-Access Stratum) Signaling Transport function, Network Sharing Function, MME Load balancing Function and the like.

Figure 3:
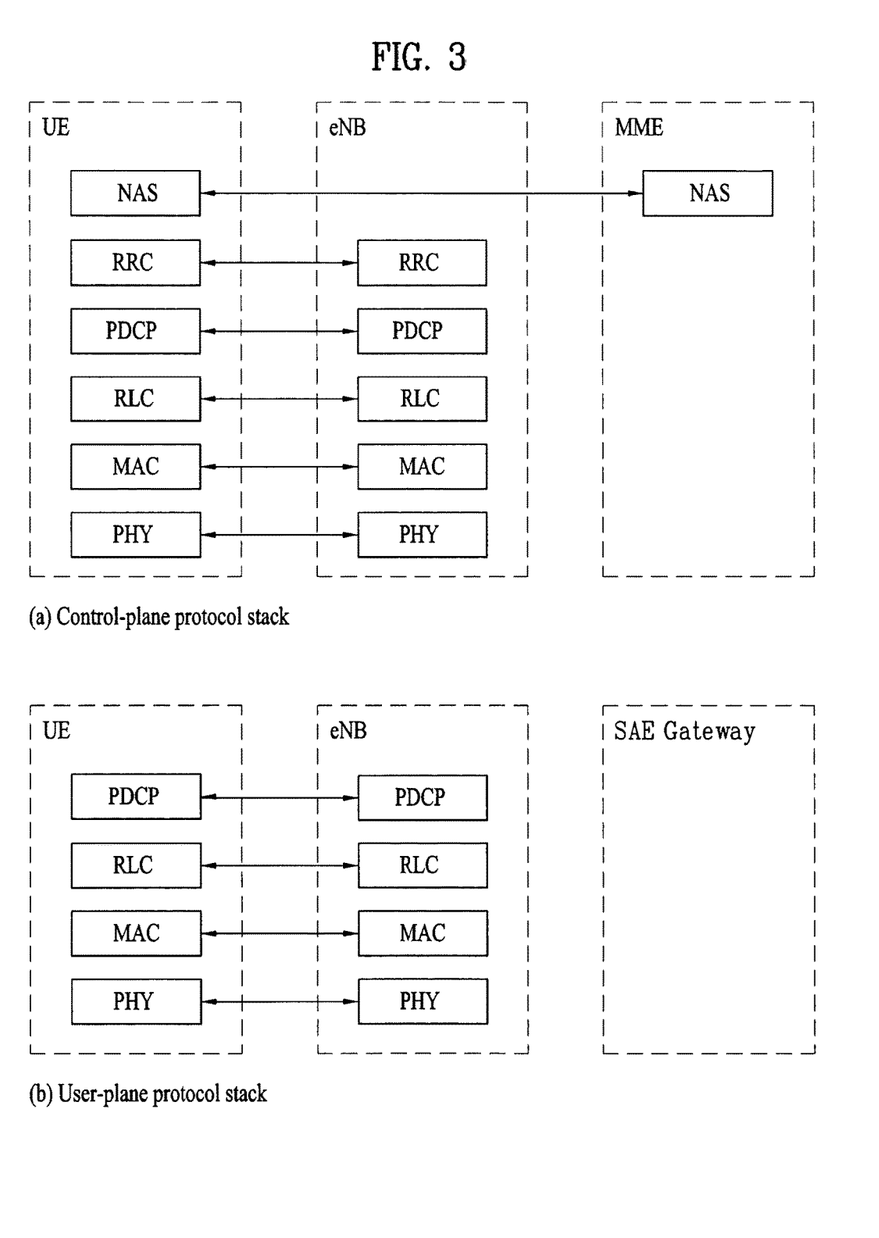
FIG. 3 illustrates the configurations of a radio interface protocol between the E-UTRAN and a UE.

FIG. 3 illustrates the configurations of a control plane and a user plane of a radio interface protocol between the E-UTRAN and a UE based on the 3GPP radio access network standard. The radio interface protocol is divided horizontally into a physical layer, a data link layer, and a network layer, and vertically into a user plane for data transmission and a control plane for signaling. The protocol layers of FIG. 3 can be divided into an L1 layer (first layer), an L2 layer (second layer), and an L3 layer (third layer) based on the lower three layers of the Open System Interconnection (OSI) reference model widely known in communication systems.

The control plane is a passage through which control messages that a UE and a network use in order to manage calls are transmitted. The user plane is a passage through which data (e.g., voice data or Internet packet data) generated at an application layer is transmitted. The following is a detailed description of the layers of the control and user planes in a radio interface protocol.

The physical layer, which is the first layer, provides an information transfer service to an upper layer using a physical channel. The physical layer is connected to a Medium Access Control (MAC) layer, located above the physical layer, through a transport channel. Data is transferred between the MAC layer and the physical layer through the transport channel. Data transfer between different physical layers, specifically between the respective physical layers of transmitting and receiving sides, is performed through the physical channel. The physical channel is modulated according to the Orthogonal Frequency Division Multiplexing (OFDM) method, using time and frequencies as radio resources.

The MAC layer of the second layer provides a service to a Radio Link Control (RLC) layer, located above the MAC layer, through a logical channel. The RLC layer of the second layer supports reliable data transmission. The functions of the RLC layer may also be implemented through internal functional blocks of the MAC layer. In this case, the RLC layer need not be present. A PDCP layer of the second layer performs a header compression function to reduce unnecessary control information in order to efficiently transmit IP packets such as IPv4 or IPv6 packets in a radio interface with a relatively narrow bandwidth.

A Radio Resource Control (RRC) layer located at the bottom of the third layer is defined only in the control plane and is responsible for control of logical, transport, and physical channels in association with configuration, re-configuration, and release of Radio Bearers (RBs). The RB is a service that the second layer provides for data communication between the UE and the E-UTRAN. To accomplish this, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode.

A Non-Access Stratum (NAS) layer located above the RRC layer performs functions such as session management and mobility management.

One cell of the eNB is set to use a bandwidth such as 1.25, 2.5, 5, 10 or 20 MHz to provide a downlink or uplink transmission service to UEs. Here, different cells may be set to use different bandwidths.

Downlink transport channels for transmission of data from the network to the UE include a Broadcast Channel (BCH) for transmission of system information, a Paging Channel (PCH) for transmission of paging messages, and a downlink Shared Channel (SCH) for transmission of user traffic or control messages. User traffic or control messages of a downlink multicast or broadcast service may be transmitted through a downlink SCH and may also be transmitted through a downlink multicast channel (MCH). Uplink transport channels for transmission of data from the UE to the network include a Random Access Channel (RACH) for transmission of initial control messages and an uplink SCH for transmission of user traffic or control messages.

Logical channels, which are located above the transport channels and are mapped to the transport channels, include a Broadcast Control Channel (BCCH), a Paging Control Channel (PCCH), a Common Control Channel (CCCH), a Multicast Control Channel (MCCH), and a Multicast Traffic Channel (MTCH).

2. Isolated E-UTRAN Operation 2.1 Definition of the Isolated E-UTRAN

In the 3GPP system, a study item was studied on Feasibility Study on Isolated E-UTRAN Operations for Public Safety (FS_IOPS) for Release 13 system. This is for Isolated E-UTRAN Operation in support of mission critical network operation for Public Safety. The normative form of this work, the work item, was also approved as an Isolated E-UTRAN Operations for Public Safety (TOPS).

The main idea lain behind the study item is to investigate needs and requirements for E-UTRAN operations when there is some failure which includes 1) operation with no connection to the EPC, 2) one or multiple eNBs, 3) interconnection between eNBs, and 4) limited backhaul capacity to the EPC.

Figure 4:
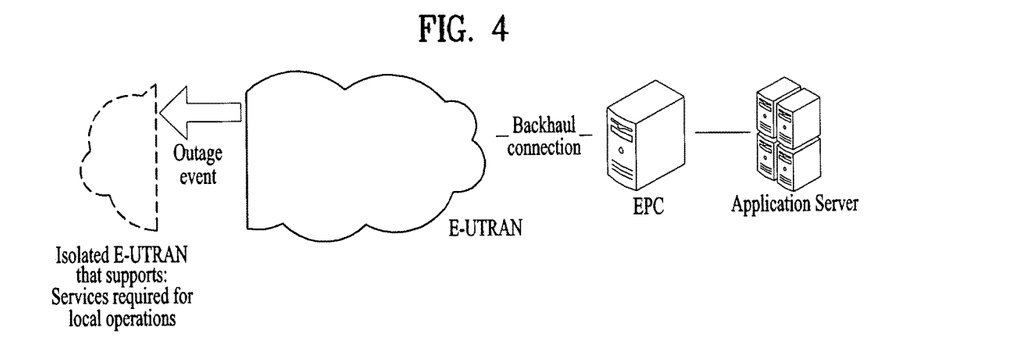
FIG. 4 illustrates one of examples of the Isolated E-UTRAN formed following an outage event within the network.

FIG. 4 illustrates one of examples of the Isolated E-UTRAN formed following an outage event within the network.

An Isolated E-UTRAN can be created following an event isolating the E-UTRAN from normal connectivity with the EPC or following deployment of standalone E-UTRAN NeNBs.

In this case, the Isolated E-UTRAN can comprises 1) operation with no connection to the EPC, 2) one or multiple eNBs, 3) interconnection between eNBs, 4) limited backhaul capability to the EPC, and 5) the services required to support local operation (e.g. Group Communication).

Referring to FIG. 4, the Isolated E-UTRAN can be created when the outage event has been occurred within the E-UTRAN system. The E-UTRAN is connected with the EPC by backhaul connection and the EPC is connected with the Application Server. When the Isolated E-UTRAN is created, the Isolated E-UTRAN is able to support services required for local operations even though a connection from the E-UTRAN has been disconnected.

2.2 Terminologies for the Isolated E-UTRAN Operations

For the purposes of the present document, the terms and definitions given in 3GPP TR 21.905 document and the following apply.

Nomadic eNB (NeNB): An NeNB is a nomadic cell and may consist: base station, antennas, microwave backhaul and support for local services. The NeNB is intended for Public Safety use providing coverage or additional capacity where: 1) coverage was never present (e.g. forest fire or underground rescue) or 2) where, for example, due to natural disaster coverage is no longer present.

Isolated E-UTRAN: The Isolated E-UTRAN can be created by either an E-UTRAN without normal connectivity with the EPC or deployed NeNBs with E-UTRAN functionality.

Isolated E-UTRAN operation: The Isolated E-UTRAN operation comprises two situations 1) in the event of an interruption to normal backhaul connectivity Isolated E-UTRAN operation aims to adapt to the failure and maintain an acceptable level of network operation in the Isolated E-UTRAN and 2) operation following the deployment of one or more Nomadic eNBs either without backhaul or with limited backhaul. The eventual goal of the Isolated E-UTRAN is a restoration of service.

Network redundancy: In the event of failure, network redundancy aims to maintain network operation with minimum downtime. This is achieved with the addition, for example, of duplicate communication paths and network elements.

Network resiliency: the Network Resiliency is an ability of a system to operate under adverse conditions. The Network Resiliency can draw on aspects of both the network redundancy and the Isolated E-UTRAN operation.

User: Within the scope of the present document the use of the term 'user' is limited to the Public Safety operation.

Limited backhaul capability: Isolated E-UTRAN operation supports operation where the Isolated E-UTRAN has no backhaul capability to the EPC. Furthermore Isolated E-UTRAN operation may have limited backhaul capability to the EPC. For the case of limited backhaul capability to the EPC only the signaling of public safety UEs can reliably be communicated to the EPC; in addition users may have the possibility to transmit a limited amount of user data with no guarantee of service.

The other terms which did not defined in this section can be used or defined on the basis of 3GPP TS 22.897 documents and the embodiments of the present application described hereinafter.

2.3 Isolated E-UTRAN Operations for Public Safety (IOPS)

IOPS-modes or IOPS operations suggest the situation that the UEs which are under the coverage of the affected cells (in IOPS operation) are subject to the restricted level of service accessibility. For some UEs, especially Public Safety UEs, it is very attractive to be aware of the Isolated E-UTRAN situation in the event of taking some calling action.

Figure 5:
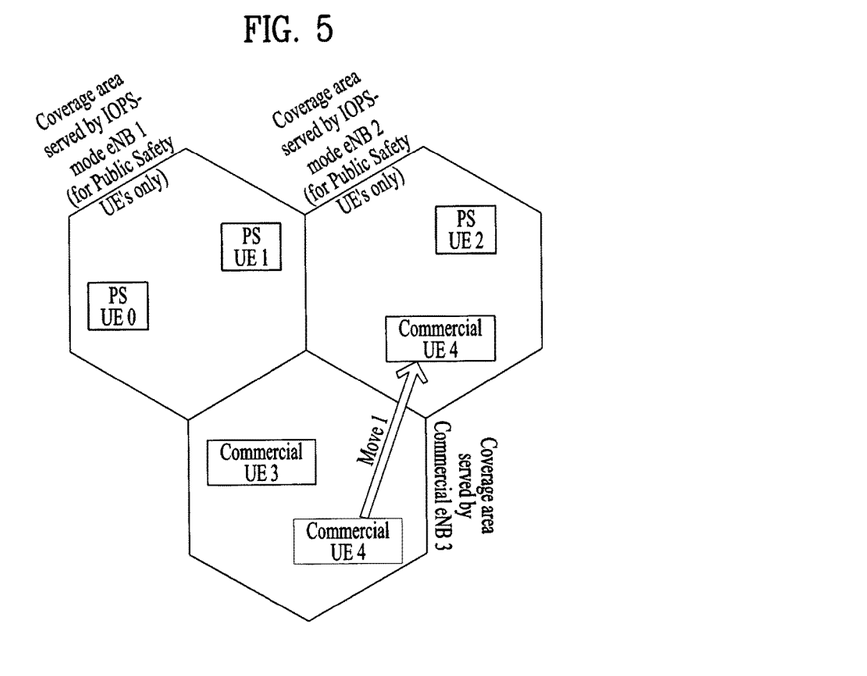
FIG. 5 illustrates one of examples of the IOPS operations.

FIG. 5 illustrates one of examples of the IOPS operations.

Referring to FIG. 5, it is assumed that the eNB1 and the eNB2 are the ones that are serving Public Safety operation and are in IOPS-mode (i.e., Isolated from the EPC) but the eNB3 is a commercial entity which is being connected with the EPC. In this case, the UE 0, the UE 1, and the UE 2 are public safety (PS) UEs which support a public safety band but the UE 3 and the UE 4 are commercial UEs which act as a normal mobile station.

In this case, the entities in FIG. 5 can perform following scenario cases.

(1) Case 1: The PS UE0 (Public Safety UE 0) may be attempting to call PS UE 1 without having to know whether or not the PS UE1 resides in the same cell. The PS UE0 can get connected to the PS UE1 if the IOPS operation allows it.

(2) Case 2: The PS UE2 may be attempting to call someone else with the need of EPC connection. However, this call attempt cannot be accomplished since the PS UE 2 is on IOPS-mode and the call attempt requires EPC connectivity.

(3) Case 3: The commercial UE3 may be attempting to make an emergency call. This call attempt can get accommodated if both "Access Class 10" and the relevant Access Classes (11 through 15) are NOT barred.

(4) Case 4: The commercial UE4, which has moved from eNB3's cell to eNB2's cell, may be attempting to make an emergency call. Even if the commercial UE4 can support the frequency band under operations in the cell of eNB2, the Commercial UE4 is not allowed because there is no EPC connectivity at this moment of time. The current LTE/LTE-A system requires that "Emergency calls shall be supported by an UE without a SIM/USIM/ISIM". This may or may not imply that the commercial UE4 can initiate an emergency call through an eNB operating in Public Safety frequency band. Even in this case, the eNB2 under IOPS operations cannot accommodate the emergency call attempts since the eNB2 does not have EPC connectivity.

In cases 2 and 4, a Public Safety officer or the civilian user under an emergency condition can get aware of the ongoing situation and take the opportunity to try to find another alternative ways as needed if the IOPS-mode eNB provides the IOPS status.

Hereinafter, it is described that methods and apparatus for notifying IOPS status information for public safety.

3. Notification of IOPS Status Information

The following definitions are used in this application disclosure document to clarify the meaning and to clarify the situation with which UEs (i.e., the commercial or the PS UEs) may confront.

1) Status of an E-UTRAN Operation represents an Ordinary Operation status and/or an IOPS Operation status.

2) Status of IOPS Operation represents an Ordinary Operation status (i.e., the status of IOPS Operations with recovery from failure) and/or the status of IOPS Operations with Failure.

The reasons why the notification of TOPS is transmitted are that 1) continuously providing local service for the PS UE and 2) disconnecting the RRC connection for the commercial UE. Because the service for the commercial UE (c-UE) is provided by the core network but the E-UTRAN has been isolated, so there is no way to provide the service to the c-UE. However, in case of PS UE, even the isolation situation has been occurred, the PS UE has to be provided the service because the PS UE is used for the public safety. In addition, for the PS UE, the notification is also needed since the PS UE has to know when the PS UE is able to re-access to the E-UTRAN with EPC for normal transmission after the IOPS mode will be resolved.

Hereinafter, methods for notifying the IOPS status information to the PS UE and c-UE when the abnormal situation (i.e., the isolation situation has been occurred).

3.1 UE in RRC_CONNECTED Mode 3.1.1 PS UE's Action

If a Public Safety UE (PS UE) stating in RRC_CONNECTED mode confronts with IOPS operation due to a broken EPC link, serving E-UTRAN may determine whether to continue the RRC Connection.

If the serving E-UTRAN determines to disconnect the connection, the PS UE may be disconnected with a notification (disconnection+notification) from the E-UTRAN. For example, the notification can be performed by a modified RRC_CONNECTION_Release message with an iopsEpcFail field indicated (in an On and Off fashion). That is, the iopsEpcFail field may be set to indicate the disconnection between the serving E-UTRAN and the EPC. Table 1 illustrates a format of the RRCConnectionRelease message may be used for the embodiments of the present inventions.

TABLE 1

```
RRCConnectionRelease-v1020-IEs ::=    SEQUENCE {
    extendedWaitTime-r10              INTEGER (1..1800)      OPTIONAL, -- Need ON
    nonCriticalExtension              SEQUENCE { }           OPTIONAL --
Need OP
}
RRCConnectionRelease-v1310-IEs ::=    SEQUENCE {
    extendedWaitTime-r10              INTEGER (1..1800)      OPTIONAL, -- Need ON
    iopsExtendedWaitTime-r13   ::=    ENUMERATED { referToExtendedWaitTime,
referToFurtherAnnouncement }
    nonCriticalExtension              SEQUENCE { }           OPTIONAL --
Need OP
}
ReleaseCause ::=                      ENUMERATED {loadBalancingTAUrequired,
                                                  other, cs-FallbackHighPriority-v1020,
iopsEpcFail}
```

The RRC_Connection_Release message is used to command the release of the RRC connection and transmitted from the E-UTRAN to the PS UE. Referring to table 1, the TOPS parameters are disclosed. For example, the extendedWaitTime field indicates a value in seconds for the wait time for Delay Tolerant access requests. The 'Delay Tolerant access' means that the access attempts by the UE to the E-UTRAN may be delayed in case of network congestion or isolated E-UTRAN. The iopsExtendedWaitTime field may be set to indicate either referring to the ExtendedWaitTime field or referring to a FurtherAnnouncement field. In this case, the FurtherAnnouncement field represents an initial access and/or a re-access to the E-UTRAN is banned until further announcement to allow the re-access will be received (via SIB messages, for example). The releaseCause field is used to indicate the reason for releasing the RRC Connection. The cause value cs-FallbackHighPriority is only applicable when redirectedCarrierInfo is present with the value set to utra-FDD, utra-TDD or utra-TDD-r10. In addition, the cause value iopsEpcFail represents the IOPS situation has been occurred. The E-UTRAN should not set the releaseCause to loadBalancingTAURequired, to cs-FallbackHighPriority, or to iopsEpcFail if the extendedWaitTime is present.

If the UE receives the RRC_Connection_Release message, the UE is able to perform following action as defined in Table 2.

TABLE 2

The UE may:
   1> delay the following actions defined in this sub-clause 60 ms from the moment the
       RRCConnectionRelease message was received or optionally when lower layers indicate
       that the receipt of the RRCConnectionRelease message has been successfully
       acknowledged, whichever is earlier;
   1> if the RRCConnectionRelease message includes the idleModeMobilityControlInfo:
      2> store the cell reselection priority information provided by the
         idleModeMobilityControlInfo;
      2> if the t320 is included:
         3> start timer T320, with the timer value set according to the value of t320;
   1> else:
      2> apply the cell reselection priority information broadcast in the system information;
   1> if the releaseCause received in the RRCConnectionRelease message indicates
       loadBalancingTAURequired:
      2> perform the actions upon leaving RRC_CONNECTED as specified in 5.3.12, with
         release cause 'load balancing TAU required';
   1> else if the releaseCause received in the RRCConnectionRelease message indicates cs-
       FallbackHighPriority:
      2> perform the actions upon leaving RRC_CONNECTED as specified in 5.3.12, with
         release cause 'CS Fallback High Priority';
   1> else if the releaseCause received in the RRCConnectionRelease message indicates
       iopsEpcFail:
      2> if the iopsExtendedWaitTime is present and the UE supports IOPS:
         3> if iopsExtendedWaitTime value is set referToExtendedWaitTime:
            4> if extended WaitTime is present
                5> forward the extendedWaitTime to upper layers;
         3> else if iopsExtendedWaitTime value is set referToFurtherAnnouncement:
            4> this UE is not allowed to re-access the system until further announcement will be
         made
            Note: types of announcement: Paging or System Information Block
         3> else;
   1> else:
      2> if the extended WaitTime is present and the UE supports delay tolerant access:
         3> forward the extendedWaitTime to upper layers;
      2> perform the actions upon leaving RRC_CONNECTED as specified in 5.3.12, with
         release cause 'other';

Referring to Table 2, if the PS UE receives the RRCConnectionRelease message with the releaseCause field set to indicate the iopsEpcFail, the PS UE releases the current connection mode and the PS UE is restricted to access to the E-UTRAN during the ExtendedWaitTime value or until the further announcement will be received.

If the E-UTRAN determines to continue the RRC connection, the PS UE may send a notification (i.e., notification only). That is, the PS UE continues to work on the connection as needed.

Figure 6:
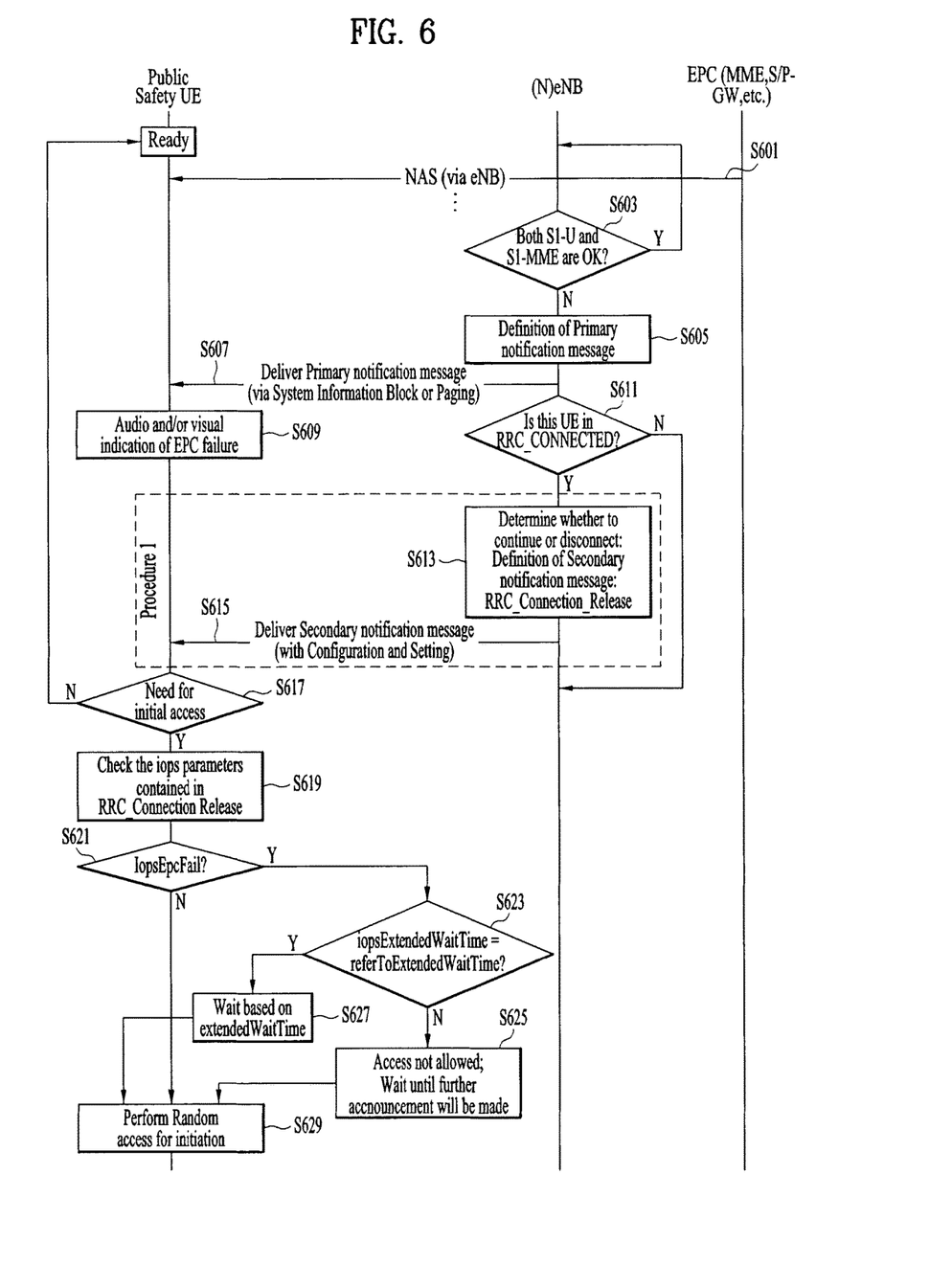
FIG. 6 illustrates one of embodiments for the IOPS status indication and action for PS UEs.

FIG. 6 illustrates one of embodiments for the IOPS status indication and action for PS UEs.

The network entities of FIG. 6 include one or more PS UE, one or more (N)eNB and the EPC. In this case, the one or more (N)eNB configures the E-UTRAN (see, FIG. 2). The PS UE's action described on FIG. 6 can be referred to Table 2.

Referring to FIG. 6, the EPC transmit NAS message via the eNB. That is the current status is normal and the EPC connection is maintained (S601).

The eNB check both S1-U and S1-MME are okay or not for determining the isolated E-UTRAN Operations for Public Safety (IOPS) situation has been occurred (S603).

At the step of S603, if the IOPS situation has not been occurred, the eNB checks the IOPS periodically or event triggered manner. However, if the IOPS situation has been occurred, the eNB configures a primary notification message to indicate the IOPS status information (or, to indicates the EPC failure) and transmits the primary notification message to the PS UEs (S605, S607).

In this case, the primary notification message can be set by System Information Block (SIB) or Paging messages. So, the primary notification messages can be transmitted all types of UE located in the coverage of the eNB.

If the PS UE receives the primary notification message, the PS UE indicates the EPC failure to the user by audio and/or visual indication (S609).

After the eNB transmits the primary notification message to the UEs located in the eNB's boundary, the eNB check that whether the PS UE is in the RRC_Connected mode or not (S611).

If the PS UE is in the RRC_Connected mode, the eNB determines whether to continue or disconnect the current connection with the PS UE (S613).

If the PS UE is in an RRC_idle mode, the eNB performs other procedure which does not described in FIG. 6 and it will be explained another embodiment of the present application.

At the step of S613, the eNB configures a secondary notification message to notify the IOPS status information and transmits the secondary notification message to the PS UE. That is, the secondary notification message further indicates that the eNB is able to act as the Isolated E-UTRAN operation. Accordingly, the PS UE is able to perform the IOPS operation with the Isolated E-UTRAN (i.e., the eNB) during the time duration indicated by the ExtendedWaitTime field or until receiving the further announcement message from the eNB. In this case, the secondary notification message may be the RRC_Connection_release message defined as in Table 1 (S615).

The procedures defined by steps of S611 to S615 can be repeatedly or periodically performed until the IOPS status has been maintained.

After performing the IOPS operation with the eNB, the PS UE check whether the PS UE needs for performing an initial access or a re-access to the serving E-UTRAN when the PS UE is needed to communicate with the EPC (S617).

At the step of S617, the PS UE transfers to a ready status when the PS UE determines that there is no need for the initial or re-access. Meanwhile the PS UE checks the IOPS parameters contained in the secondary notification message (i.e., the RRC_Connection_Release message) when the PS UE determines to perform the initial access procedure (S619).

After then, the PS UE checks the IOPS status has been recovered or the EPC failed status has been still maintained based on the IOPS parameters (S621).

The PS UE checks the iopsExtendedWaitTime field based on Table 1 (S623).

If the iopsExtendedWaitTime field is set to a value of 'referToFurtherAnnouncement', the PS UE waits until further announcement message such as SIB or paging messages indicating the IOPS status was resolved and then the PS UE performs random access procedure for initial or re-access (S625).

If the iopsExtendedWaitTime field is set to a value of 'referToExtendedWatiTime', the PS UE waits during time duration based on extendedWaitTime field included in the second notification message and then performs random access procedure for initial or re-access (S627).

At the step of S621, if the second notification message indicates that the EPC has not been failed, the PS UE immediately performs the random access for initial or re-access (S629).

Figure 7:
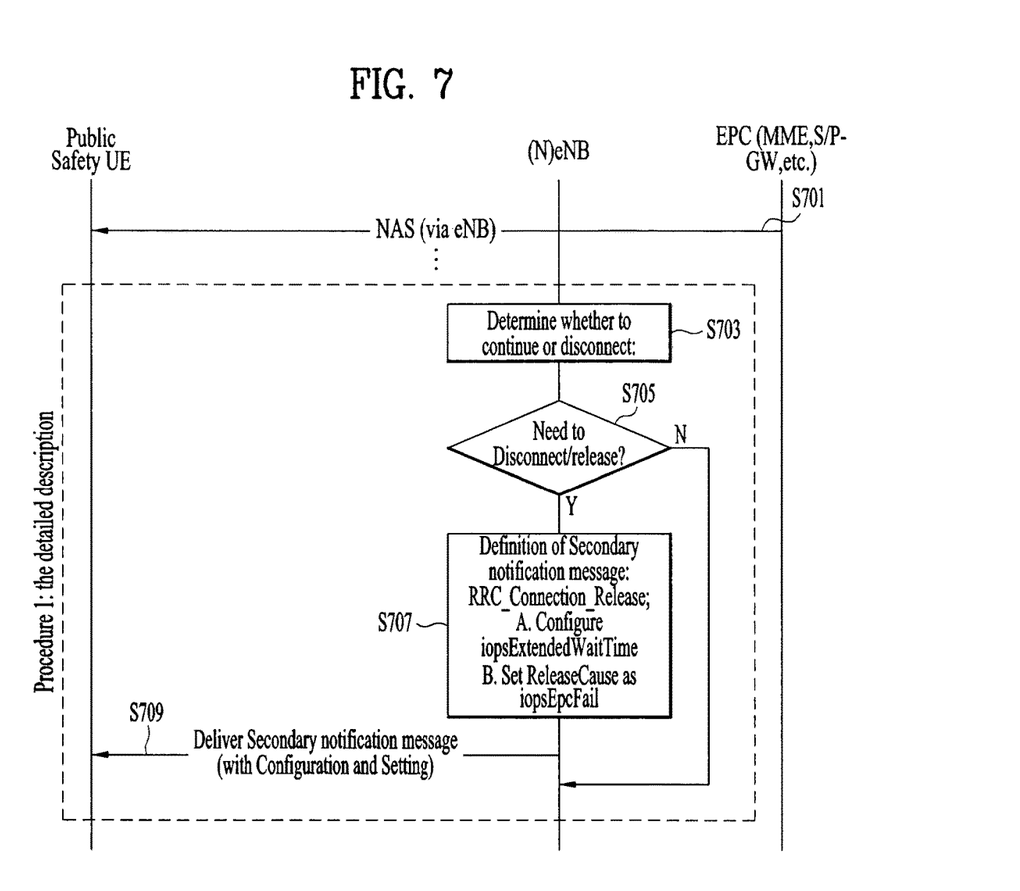
FIG. 7 illustrates one of embodiments for the IOPS status indication and actions for PS UE.

As another aspect of the present application, the procedure 1 including the steps S613 and S615 can be differently performed as FIG. 7. FIG. 7 illustrates one of embodiments for the IOPS status indication and actions for PS UE.

The EPC transmits NAS message via the eNB. That is the current status is normal and EPC connection is established (S701).

However, due to natural disaster or other reason, the IOPS status can be occurred. In this case, the eNB may determine whether to continue or disconnect with the current RRC connection with the PS UE (S703).

If it is needed to disconnect or release the current RRC connection, the eNB configures the secondary notification message including the iopsExtendedWatiTime field and the ReleaseCause field set with the iopsEpcFail value. In this case, the secondary notification message can be the RRC_Connection_Release message defined as Table 1 (S705, S707).

After then, the eNB transmits the configured secondary notification message to the PS UE (S709).

At the step of S705, if the eNB and the PS UE need to continuously connected for public safety, the eNB does not transmit the secondary notification message to the PS UE and maintains the RRC connection with the PS UE even though the IOPS situation has been occurred. Because the PS UE can support the PS frequency band, the PS UE is able to maintain and communicate with the eNB without the EPC (i.e., the core network).

3.1.2 Commercial UE's Action

If a commercial UE (c-UE) stating in RRC_CONNECTED mode confronts with IOPS due to a broken EPC link, the c-UE shall be disconnected with a notification from the E-UTRAN (since commercial UE is not allowed to be served in IOPS status). For example, if the RRC_CONNECTION_Release message with iopsEpcFail field which defined in Table 1 has been received, the c-UE disconnects the current RRC connection according to Table 2.

Figure 8:
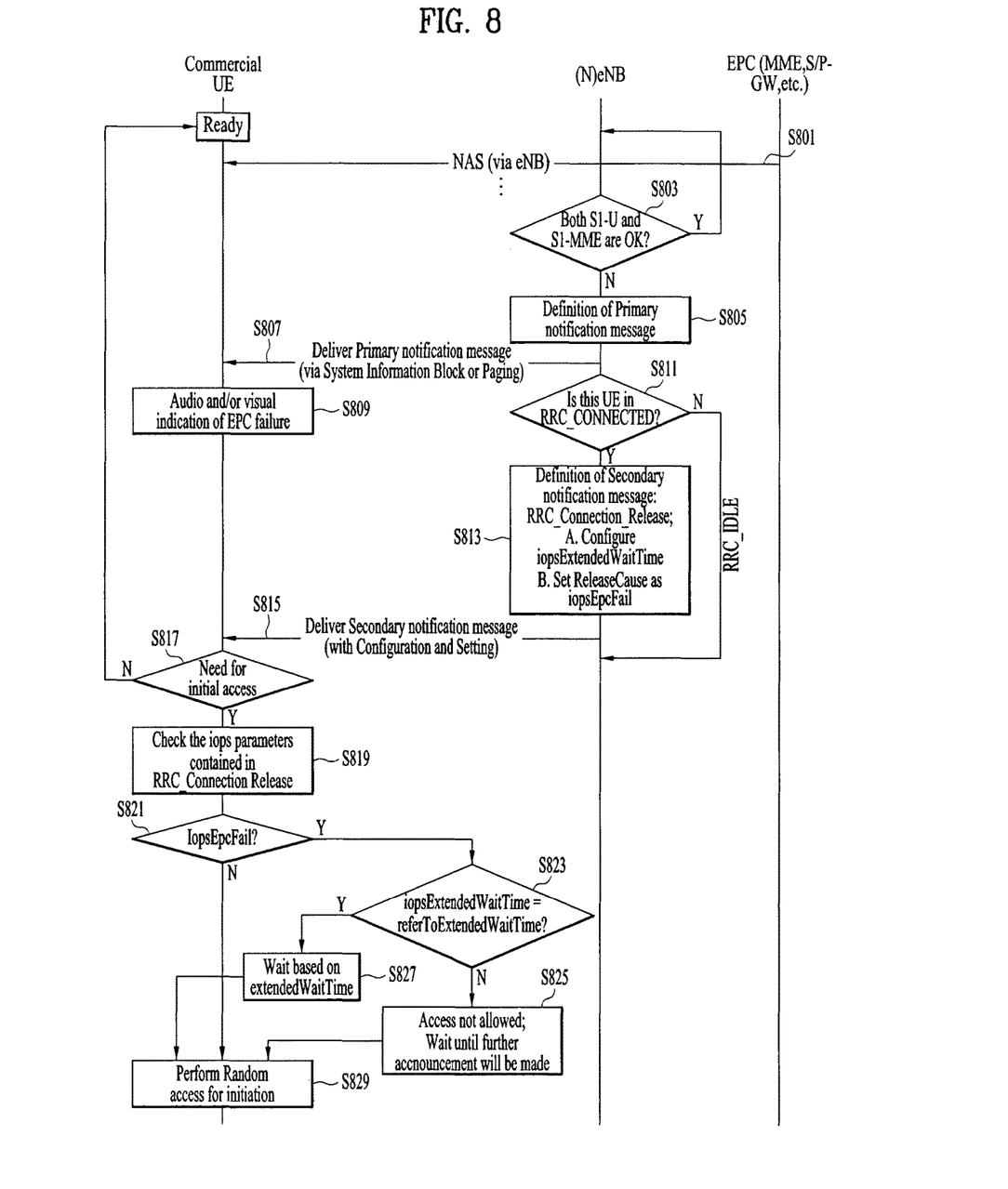
FIG. 8 illustrates one of embodiments for the IOPS status indication and action for commercial UEs.

FIG. 8 illustrates one of embodiments for the IOPS status indication and action for commercial UEs.

The network entities of FIG. 8 include one or more commercial UEs (c-UEs), one or more (N)eNB and the EPC. In this case, the one or more (N)eNB configures the E-UTRAN (see, FIG. 2).

Referring to FIG. 8, the EPC transmit NAS message via the eNB. That is the current status is normal and the EPC connection is maintained (S801).

The eNB check both S1-U and S1-MME are okay or not for determining the isolated E-UTRAN Operations for Public Safety (IOPS) situation has been occurred (S803).

At the step of S803, if the IOPS situation has not been occurred, the eNB checks the IOPS, periodically or event triggered manner. However, if the IOPS situation has been occurred, the eNB configures a primary notification message to indicate the IOPS status information (or, to indicate the EPC failure) and transmits the primary notification message to the c-UEs (S805, S807).

In this case, the primary notification message can be set by System Information Block (SIB) or Paging messages. So, the primary notification messages can be transmitted all types of UE located in the coverage of the eNB.

If the c-UE receives the primary notification message, the c-UE indicates the EPC failure to the user by audio and/or visual indication (S809).

After the eNB transmits the primary notification message to the UEs located in the eNB's boundary, the eNB check whether the c-US is in the RRC_Connected mode or not (S811).

If the c-UE is in an RRC_idle mode, the eNB performs other procedure which does not described FIG. 8 and it will be explained another embodiment of the present application.

If the c-UE is in the RRC_connected mode, the eNB configures the secondary notification message including the iopsExtendedWatiTime field and the ReleaseCause field set with the iopsEpcFail value. In this case, the secondary notification message can be the RRC_Connection_Release message defined as Table 1 (S813).

The eNB transmits the secondary notification message to the c-UEs (S815).

After receiving the first notification message or the secondary notification message, the c-UE disconnects or releases the RRC connection with the eNB. However, if the c-UE needs for performing initial or re-access to the E-UTRAN (S817), the c-UE checks the IOPS parameters contained in the secondary notification message (i.e., the RRC_Connection_Release message) when the c-UE determines to perform the initial or re-access procedure (S819).

Meanwhile, at the step of S817, the c-UE transfers to a ready status when the c-UE determines that there is no need for the initial access.

After then, the c-UE checks the IOPS status has been still maintained (i.e., the EPC failed) (S821).

If the secondary notification message indicates that the EPC failed and IOPS status has been occurred and maintained, the c-UE checks the iopsExtendedWaitTime field based on Table 1 (S823).

If the iopsExtendedWaitTime field is set to a value of 'referToFurtherAnnouncement', the c-UE waits until further announcement message such as SIB or paging messages indicating the IOPS status was resolved and then the c-UE performs random access procedure for initial access (S825).

If the iopsExtendedWaitTime field is set to a value 'referToExtendedWatiTime', the c-UE waits during time duration based on extendedWaitTime field included in the second notification message and then performs random access procedure for initial access (S827).

At the step of S821, if the second notification message indicates that the EPC has not been failed, the c-UE immediately performs the random access for initial or re-access with the eNB or another eNB (S829).

3.2 UE in RRC_IDLE Mode

If the IOPS operation has to be performed, the E-UTRAN announces that IOPS operation has begun or will begin due to a broken EPC link via System Information block (SIB) or Paging messages for the UEs in the RRC idle mode.

If the c-UE receives the SIB or the paging messages, the c-UE is considered that they are NOT allowed to access the system. So, the c-UE provides audio or visual indication to the user that the EPC has failed even if E-UTRAN is working.

For the PS UEs, it is considered that they are allowed to access the system at their discretion (i.e., they are aware of IOPS operations). The PS UE also provides audio or visual indication to the user that EPC has failed even if E-UTRAN is working.

For both c-UE and PS UE, they follow the RRCConnectionReject instruction which is similar to what RRCConnectionRelease instructs when they are attempting to access the system (e.g., initiate a session).

One of formats of the RRC_Connection_Reject message is described in Table 3.

TABLE 3

```
RRCConnectionReject-v1310-IEs ::= SEQUENCE {
    extendedWaitTime-r13         INTEGER (1..1800)
    OPTIONAL, -- Need ON
    iopsExtendedWaitTime-r13  ::=   ENUMERATED {
referToExtendedWaitTime, referToFurtherAnnouncement }
    nonCriticalExtension         RRCConnectionReject-v1130-IEs
    OPTIONAL -- Need OP
}
RejectCause ::=            ENUMERATED { iopsEpcFail}
```

The RRC_Connection_Reject message is used to reject the initial or re-access from the idle mode UE (e.g., the c-UE and/or PS UE). Referring to Table 3, the IPOS parameters are disclosed. For example, the extendedWaitTime field indicates a value in seconds for the wait time for Delay Tolerant access requests. The 'Delay Tolerant access' means that the access attempts by the UE to the E-UTRAN may be delayed in case of network congestion or isolated E-UTRAN. The iopsExtendedWaitTime field may be set to indicate either referring to the ExtendedWaitTime field or referring to a FurtherAnnouncement field. In this case, the FurtherAnnouncement field represents a (re)access to the E-UTRAN is banned until further announcement to allow the re-access will be received (via SIB messages, for example). The rejectCause field is used to indicate the reason for rejecting the initial access. The cause value iopsEpcFail represents the IOPS situation has been occurred. The E-UTRAN should not set the releaseCause to iopsEpcFail if the extendedWaitTime is present.

If the UE receives the RRC_Connection_Reject message, the UE is able to perform following action as defined in Table 4.

TABLE 4

5.3.3.8 Reception of the RRCConnectionReject by the UE

The UE shall:
   1> stop timer T300;
   1> reset MAC and release the MAC configuration;
   1> start timer T302, with the timer value set to the wait Time;
   1> if the extendedWaitTime is present and the UE supports delay tolerant access:
      2> forward the extendedWaitTime to upper layers;
   1> else if the rejectCause received in the RRCConnectionReject message indicates iopsEpcFail:
      2> if the iopsExtendedWaitTime is present and the UE supports IOPS:
         3> if iopsExtendedWaitTime value is set referToExtendedWaitTime:
            4> if extended WaitTime is present
               5> forward the extendedWaitTime to upper layers;
         3> else if iopsExtendedWaitTime value is set referToFurtherAnnouncement:
            4> this UE is not allowed to re-access to the system until further announcement will be made
               Note: types of announcement: Paging or System Information Block
      3> else;
   1> if deprioritisationReq is included:
      2> start or restart timer T325 with the timer value set to the deprioritisationTimer signalled;
      2> store the deprioritisationReq until T325 expiry;
   NOTE:   The UE stores the deprioritisation request irrespective of any cell reselection absolute priority assignments (by dedicated or common signalling) and regardless of RRC connections in E-UTRAN or other RATs unless specified otherwise.
   1>   inform upper layers about the failure to establish the RRC connection and that access barring for mobile originating calls, mobile originating signalling, mobile terminating access and mobile originating CS fallback is applicable, upon which the procedure ends;

Referring to Table 4, if the UE receives the RRCConnectionReject message with the releaseCause field set to indicate the iopsEpcFail, the UE is restricted to access to the E-UTRAN during the ExtendedWaitTime value or until the further announcement will be received.

3.3 Announcement of IOPS Status Resolution

An announcement of IOPS status resolution is a procedure that an eNB makes an announcement (i.e., the announcement of IOPS status for UE's which have received "referToFurtherAnnouncement" and been waiting for further announcement from the network) that the IOPS mode was resolved so that commercial UE's and Public Safety UE's which requires EPC access for their connection establishment.

By introducing a new information field "ac-barringForIOPS", which can be a Boolean variable or more complex variable (such as, Integer variable), the eNB will be able to send an indication regarding the IOPS status (or IOPS mode)

to the corresponding UE's. The "ac-barringForIOPS" field may be included in the SIB message as following Table 5.

TABLE 5

```
SystemInformationBlockType2 ::=    SEQUENCE {
    ac-BarringInfo                     SEQUENCE {
        ac-BarringForEmergency             BOOLEAN,
        ac-BarringForMO-Signalling         AC-BarringConfig
OPTIONAL, -- Need OP
        ac-BarringForMO-Data           AC-BarringConfig        OPTIONAL --
Need OP
        ac-BarringForIOPS              BOOLEAN,                OPTIONAL --
Need OP
}
    OPTIONAL, -- Need OP
    radioResourceConfigCommon          RadioResourceConfigCommonSIB,
    ue-TimersAndConstants              UE-TimersAndConstants,
    freqInfo                           SEQUENCE {
        ul-CarrierFreq                     ARFCN-ValueEUTRA
OPTIONAL, -- Need OP
        ul-Bandwidth                   ENUMERATED {n6, n15, n25, n50, n75, n100}
OPTIONAL, -- Need OP
        additionalSpectrumEmission         AdditionalSpectrumEmission
    },
    mbsfn-SubframeConfigList           MBSFN-SubframeConfigList
OPTIONAL, -- Need OR
    timeAlignmentTimerCommon           TimeAlignmentTimer,
    ...,
    lateNonCriticalExtension       OCTET STRING (CONTAINING
SystemInformationBlockType2-v8h0-IEs)                          OPTIONAL, -- Need OP
    [[  ssac-BarringForMMTEL-Voice-r9    AC-BarringConfig
OPTIONAL, -- Need OP
        ssac-BarringForMMTEL-Video-r9    AC-BarringConfig
OPTIONAL -- Need OP
    ]],
    [[  ac-BarringForCSFB-r10          AC-BarringConfig        OPTIONAL --
Need OP
    ]]
}
...
```

After receiving the further announcement message (i.e., the SIB) with the ac-BarringforIOPS, the UE is able to perform the initial or re-access with the eNB.

4. Apparatuses for Implementing the Aforementioned Methods

Figure 9:
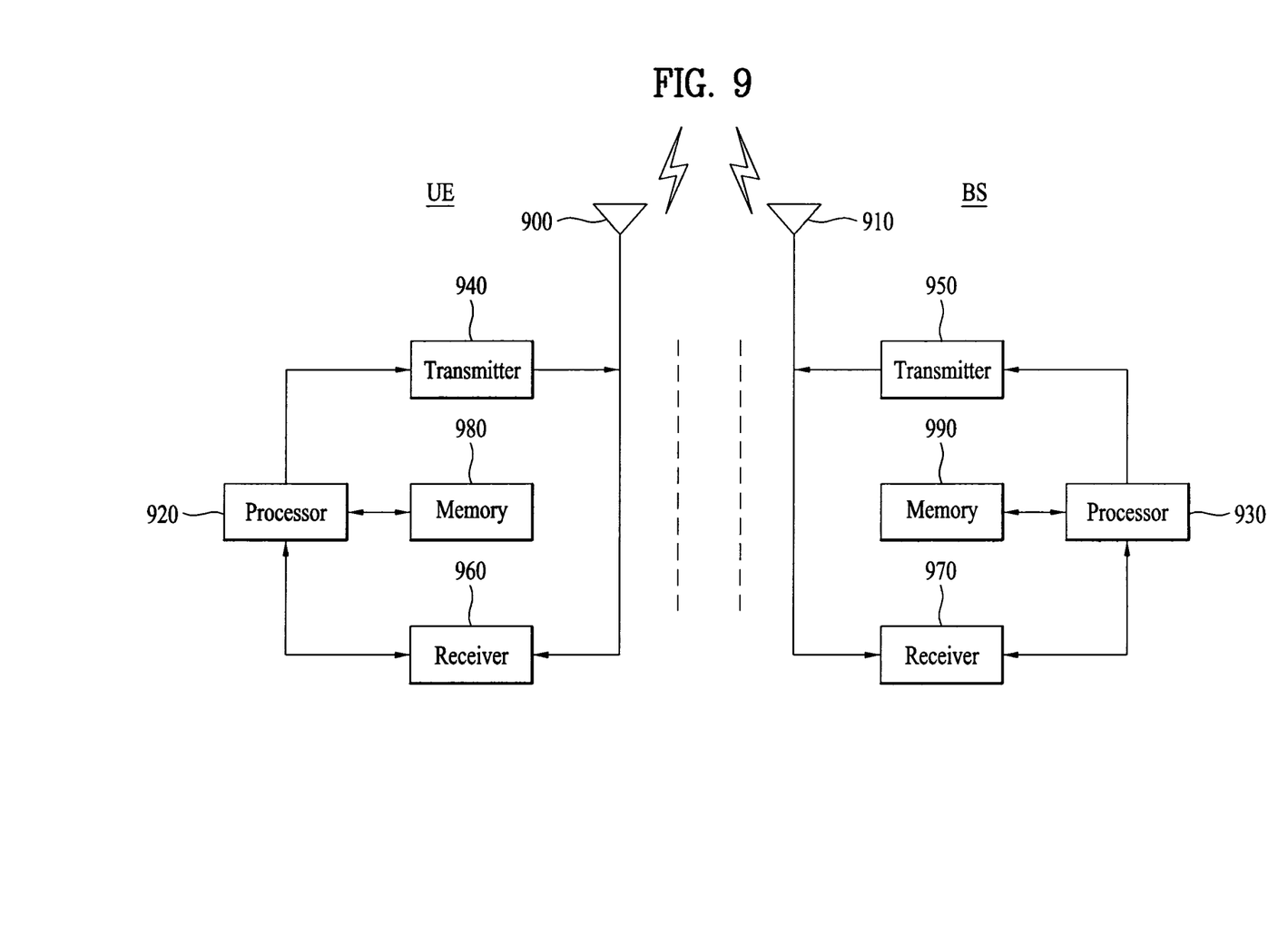
FIG. 9 shows apparatuses for implementing the above-mentioned methods described with reference to FIGS. 1 to 8.

FIG. 9 shows apparatuses for implementing the above-mentioned methods described with reference to FIGS. 1 to 8.

A UE can serve as a transmitting end on uplink and as a receiving end on downlink. An eNB can serve as a receiving end on uplink and as a transmitting end on downlink.

The UE and the eNB may include transmitter 940 and 950 and receiver 960 and 970 for controlling transmission and reception of signal, data and/or messages and antennas 900 and 910 for transmitting and receiving signal, data and/or messages, respectively. In this case, the UE may further include a screen to display user information such as a current time, a battery state, an event occurrence history, weather, and/or multimedia contents etc.

In addition, the UE and the eNB may respectively include processors 920 and 930 for performing the above-described embodiments of the present invention and memories 970 and 990 for storing processing procedures of the processors temporarily or continuously. For example, the processor of the UE is configured to control the receiver to receive the RRC_Connection_Release message, the RRC_Connection_Rejection message, and/or the SIB messages. After receiving these messages, the processor of the UE is able to maintain the IOPS parameters for restricting the attempt to perform the initial access to the E-UTRAN. In addition, the processor of the E-UTRAN is able to determine the IOPS status and transmit the messages to the UEs to notify the IOPS status information. The detail of the embodiments of the present application can be referred to sections 1 to 3 as disclosed above.

The embodiments of the present invention can be performed using the aforementioned components and functions of the UE and the eNB. The transmitter 940 and 950 and the receiver 960 and 970 included in the UE and the eNB can have packet modulation and demodulation functions, a fast packet channel coding function, an OFDMA packet scheduling function, a TDD packet scheduling function and/or a channel multiplexing function. In addition, the UE and the eNB may further include a low-power radio frequency (RF)/intermediate frequency (IF) unit.

In the embodiments of the present invention can use a personal digital assistant (PDA), a cellular phone, a personal communication service (PCS) phone, a global system for mobile (GSM) phone, a wideband CDMA (WCDMA) phone, a mobile broadband system (MBS) phone, a hand-held PC, a notebook PC, a smart phone, a multi-mode multi-band (MM-MB) terminal or the like as the UE.

Here, the smart phone is a terminal having advantages of both a mobile communication terminal and a PDA. The smart phone can be a mobile communication terminal having scheduling and data communication functions including facsimile transmission/reception, Internet access, etc. of the PDA. The MM-MB terminal means a terminal including a multi-modem chip, which can be operated in both a portable Internet system and a mobile communication system (e.g., CDMA 2000 system, WCDMA system, etc.).

The exemplary embodiments of the present invention may be achieved by various means, for example, hardware, firmware, software, or a combination thereof.

In a hardware configuration, the exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the exemplary embodiments of the present invention may be achieved by a module, a procedure, a function, etc. performing the above-described functions or operations. Software code may be stored in a memory unit and executed by a processor. The memory unit may be located at the interior or exterior of the processor and may transmit and receive data to and from the processor via various known means.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The embodiments of the present invention may be applied to various wireless access systems. The wireless access systems include 3GPP, 3GPP2 and/or IEEE 802.xx (Institute of Electrical and Electronic Engineers 802) system, etc. The embodiments of the present invention may be applied to technical fields using the various wireless access systems in addition to the wireless access systems.

What is claimed is:

1. A method for supporting an Isolated E-UTRAN Operations for Public Safety (IOPS) in a wireless access system, the method performed by a User Equipment (UE) in a Radio Resource Control (RRC) connection mode and comprising:

receiving, from an e-Node B (eNB), a RRC connection release message including a release cause field and TOPS extended wait time field for restricting an access procedure;

releasing the RRC connection mode when the release cause field indicating an TOPS situation has occurred, wherein the IOPS extended wait time field is configured to an Extended Wait Time (EWT) field indicating a time duration restricting the access procedure or to a Further Announcement field indicating the access procedure is restricted until a further announcement is received;

when the IOPS extended wait time field is configured to the Further Announcement field, receiving the further announcement indicating the IOPS situation is resolved; and performing the access procedure.

2. The method according to claim 1, further comprising:

performing an TOPS operation with the base station during the time duration.

3. The method according to claim 1, further comprising:

when the TOPS extended wait time field is configured to the Extended Wait Time field, performing the access procedure after the time duration is expired.

4. The method according to claim 1, wherein the further announcement is received via a System Information Block or a paging message.

5. A method for supporting an Isolated E-UTRAN Operations for Public Safety (IOPS) in a wireless access system, the method performed by an e-Node B (eNB) and comprising:

configuring a radio resource control (RRC) connection release message including a release cause field and an TOPS extended wait time field for restricting an access procedure;

transmitting, to a User Equipment (UE), the RRC connection release message, wherein the TOPS extended wait time field is configured to an Extended Wait Time field indicating a time duration restricting the access procedure or to a Further Announcement field indicating the access procedure is restricted until a further announcement is received; and when the TOPS extended wait time field is configured to the Further Announcement field, transmitting the further announcement indicating the TOPS situation is resolved; and performing the access procedure.

6. The method according to claim 5, further comprising:

determining whether to continue or disconnect a RRC connected mode of a user equipment based on the user type when the TOPS has occurred.

7. The method according to claim 5, further comprising:

performing an TOPS operation with a public safety user equipment (PS UE) during the time duration.

8. The method according to claim 5, further comprising:

when the TOPS extended wait time field is configured to the Extended Wait Time field, performing the access procedure after the time duration is expired.

9. The method according to claim 5, wherein the further announcement is transmitted via a System Information Block or a paging message.

* * * * *